April 25, 1950     W. D. TIPTON     2,505,160
AUTOMATIC POWER TRANSMISSION
Filed Aug. 10, 1945
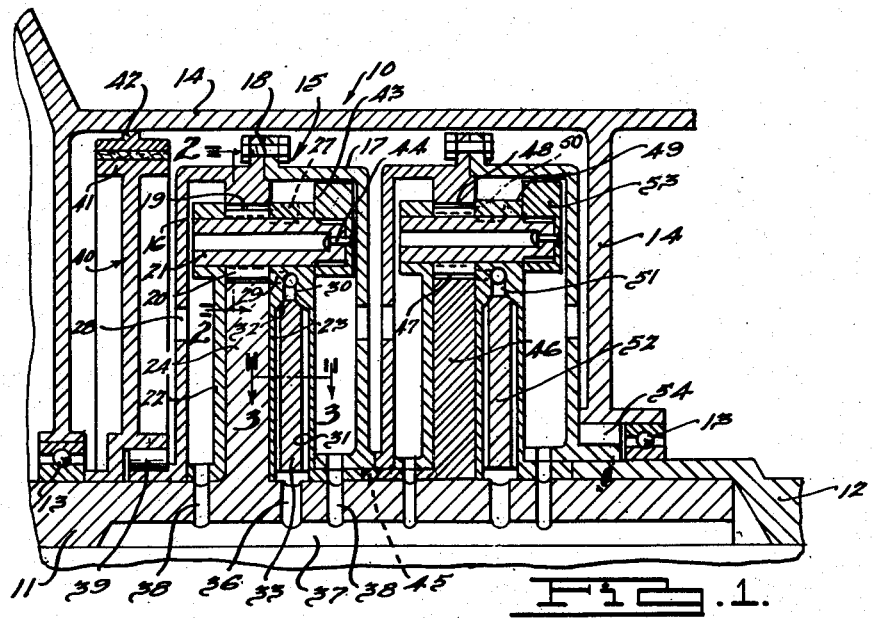
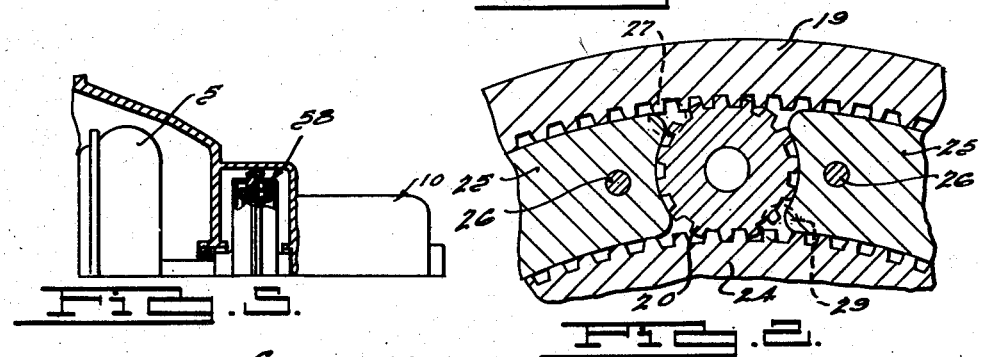
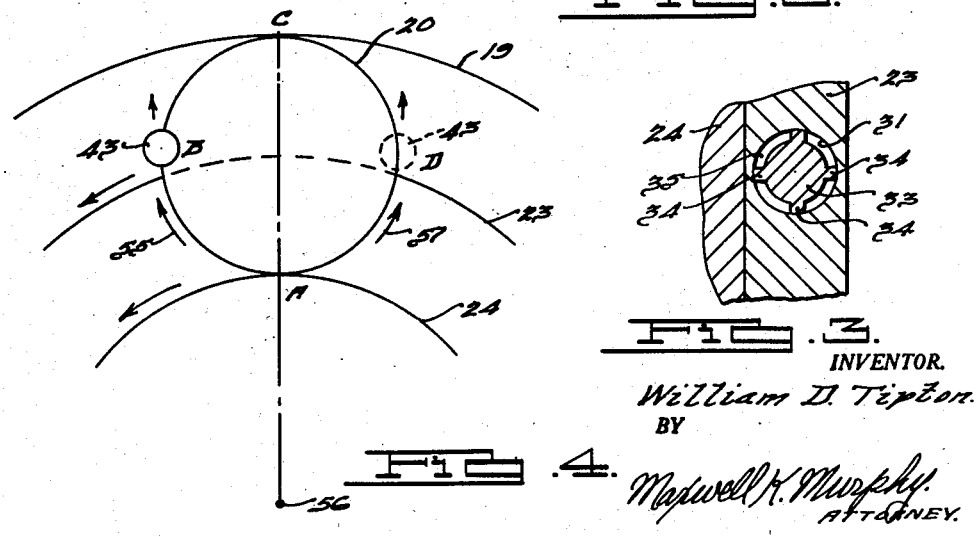
INVENTOR.
William D. Tipton.
BY
Maxwell K. Murphy.
ATTORNEY.

Patented Apr. 25, 1950

2,505,160

UNITED STATES PATENT OFFICE 2,505,160

AUTOMATIC POWER TRANSMISSION

William D. Tipton, Stoneleigh, Md.; Elizabeth Barrett Tipton, executrix of said William D. Tipton, deceased, assignor of one-half to Maxwell K. Murphy, Detroit, Mich.

Application August 10, 1945, Serial No. 609,981

3 Claims. (Cl. 74—752)

1

This invention relates generally to transmissions and more particularly to transmissions of the planetary type.

An object of the invention is to provide a transmission in which the gear ratio is automatically varied in accordance with speed and torque requirements. With this construction, the increase to a higher gear ratio is effected in direct relation to the output speed and in inverse relation to the input torque.

Another object of the invention is to provide a transmission of the planetary type adapted to normally transmit power at decreased speed and increased torque, and arranged to be automatically operated to transmit torque at a unitary ratio. This is accomplished by enclosing the gears of the planetary gearset in such a manner that they will operate as a fluid pump, and controlling the outlet passage of the pump by a valve automatically operated by centrifugal force to restrict the outlet under certain conditions of output speed and input torque. In this construction, one element of the gearset is connected to a stationary structure through a one way brake to prevent reverse rotation and to provide a reaction point for the transmission of increased torque.

Still another object of the invention is to provide a transmission of the planetary type in which the planet gears carry counterweights adapted to be urged by centrifugal force radially outwardly with respect to the center of rotation of the planet carrier and to cooperate with a separate fluid braking torque opposing the input torque to lock the gears of the planetary gearset. Torque and speed are then transmitted at unitary ratio.

A still further object of the invention is to provide a transmission in which various torque ratios may be obtained by employing one or more planetary gearsets connected in series, all of which are automatically controlled.

It is also an object to provide a transmission in which the hydraulic control fluid is used to lubricate various parts of the transmission.

Other objects and advantages of the invention will be made more apparent as this description proceeds, particularly when considered in connection with the accompanying drawings, in which:

Fig. 1 is a fragmentary longitudinal cross-sectional view through a transmission embodying the present invention;

Fig. 2 is a cross-sectional view taken substantially on the plane indicated by the line 2—2 of Fig. 1;

Fig. 3 is a cross-sectional view taken substan-

2 tially on the plane indicated by the line 3—3 of Fig. 1;

Fig. 4 is a diagrammatical view of the transmission; and

Fig. 5 is a fragmentary longitudinal cross-sectional view illustrating a particular installation of the invention.

Referring now more particularly to the drawings, the transmission 10 is adapted to connect the driving shaft 11 of an engine (not shown) to a driven shaft 12 which drives the wheels of a vehicle or other load. Both the driving and driven shafts are journaled in bearings 13 carried by the housing 14.

A casing 15, comprising two sections 16 and 17 bolted together by bolts 18, is mounted for rotation about shaft 11. Section 16 has integrally formed therewith an internal or ring gear 19. Ring gear 19 meshes with a plurality of planet gears 20 carried on spindles 21, the latter being rotatably carried in side plates 22 and 23 forming a planet carrier. The planet gears 20 in turn mesh with a sun gear 24 carried by the driving shaft 11 between the carrier side plates 22 and 23.

The side plates 22 and 23 of the planet carrier are positioned adjacent opposite sides of the sun, ring and planet gears of the transmission and form therewith a fluid tight chamber. As best seen in Fig. 2, the spaces between the gears are closed by spacers 25 which fit adjacent the ends of the gear teeth. Any suitable means, such as bolts 26, are used to hold the carrier side plates 22 and 23 and the spacers 25 together. The gears thus cooperate with each other and with the side plates and spacers to form a fluid gear pump of a type well known in the art.

Inlet and outlet passages 27, 29 are provided adjacent each planet gear. The inlet passages 27 are in the side plate 22 and establish communication between the interior of the fluid pumps and the interior of casing 15. Casing 15 is supplied with fluid from the transmission housing 14 through apertures 28 in the casing sections 16 and 17.

The side plate 23 of the planet carrier is formed with an outlet passage 29 opening into the interior of the fluid pump at the point where the teeth of planet gear 20 mesh with the teeth of sun gear 24. Since the inlet passage 27 opens into the pump at the point where the teeth of planet gear 20 mesh with the teeth of ring gear 19, it will be seen that the inlet and outlet passages are located at diametrically opposite points on the periphery of the planet gear 20. The gear teeth thus force fluid from the inlet passage to the outlet passage at a pressure varying directly with the input torque of the transmission.

Outlet passage 29 has a radially inwardly extending portion 30 opening into an enlarged radially extending bore 31 and forming therewith a valve seat 32. A valve plunger 33 is received within the radial bore 31 and has circumferentially spaced longitudinally extending flutes 34, Fig. 3, which support the plunger for reciprocation within the bore. Longitudinally extending grooves 35 are thus formed in the plunger intermediate the flutes 34 and permit the passage of fluid past the plunger.

The radially inner end of the bore 31 communicates with a passage 36 opening into the axial passage 37 in the driving shaft 11. Openings 38 provide for the return of the fluid to casing 15. It will be noted that with this construction the bearings, gears and other working parts of the transmission are lubricated properly by the fluid pumped by the gear pump formed by the planetary gearset.

To enable the planetary gearset to transmit power at reduced speed and increased torque, the casing 15 carrying ring gear 19 is connected to the transmission housing through a one way clutch 39 of the type well known in the art. The clutch 39 is carried by a rotatably mounted brake drum 40 having a braking flange 41 adapted to be engaged by a brake shoe 42, the latter being mounted on housing 14 in any suitable manner to provide a reaction for the planetary gearset.

With the brake shoe 42 engaging the braking flange 41 and preventing rotation of the brake drum 40, the one way clutch 39 permits forward rotation of the ring gear 19 but prevents rearward rotation thereof. With this construction, when the sun gear 24 is rotated by the driving shaft 11 and the ring gear 19 restrained against rearward rotation by the one way clutch, the planet carrier will be rotated forwardly at reduced speed and increased torque. The gear ratio can be predetermined by proper design of the sun, ring and planet gear sizes.

A counterweight 43 is carried by the spindle 21 for each planet gear 20, being keyed to the end of the spindle and held thereon by the rivet 44. The center of gravity of the counterweight 43 is displaced from the axis of the spindle and the counterweights on adjacent planet gears are angularly out of phase with each other by an angle equal to 360 degrees divided by the number of planet gears. Thus the center of gravity of all of the counterweights, taken as a system, coincides with the center of rotation of the planet carrier, and the unit is always in dynamic balance.

Although a single planetary gearset may be used if desired, I have shown in Fig. 1 a pair of such units connected in series. Likewise, any number of units may be coupled together to obtain the number of gear ratios required in transmission. The output speed and torque from the above described planetary gearset is transmitted from side plate 23 of its planet carrier through the jaw clutch 45 to the sun gear 46 of the second planetary gearset. This second gearset is similar in construction to the first and includes planet gears 47, ring gear 48, planet carrier 49, inlet passage 50, outlet passage 51, valve 52 and planet gear counterweight 53. A one way brake 54 is connected between ring gear 48 and the transmission housing 14, and the output torque and speed is transmitted from the planet carrier 49 to the driven shaft 12.

In operation, referring to Fig. 1, and particularly to Fig. 4 which illustrates diagrammatically the several parts of the planetary gearset, power from the driving shaft 11 rotates the sun gear 24 in a counter-clockwise direction, and, since clockwise rotation of the ring gear 19 is prevented by the one way clutch 39 and brake, the planet gears 20 are rotated in the direction of arrow 55 causing counterclockwise rotation of planet carrier side plate 23 at a reduced speed.

Rotation of the planet carrier about its center of rotation 56 imparts a centrifugal force to the counterweight 43 carried by the planet gear 20, tending to move it radially outwardly from center 56. During the movement of the counterweight 43 along arc ABC, Fig. 4, its centrifugal force adds to the applied torque of the planet gear in the direction of arrow 55, while its movement through arc CDA decreases the planet gear torque. Assuming the input torque of the transmission to be more than the torque from the centrifugal force on counterweights 43, the planetary gearset will continue to transmit power at reduced speed and increased torque and will not lock up. If, however, a braking torque is applied to the planet gears 20 in the direction of arrow 57 and of such an amount that the braking torque plus the torque from the counterweight centrifugal force exceeds the applied torque in the direction of arrow 55, then the planet, sun and ring gears will lock with each other. This is accomplished when the centrifugal force on valve plunger 33, which is carried by the rotating side plate 23 of the planet carrier, is sufficient to cause it to engage valve seat 32 and close the outlet passage from the fluid pump formed by the sun, ring and planet gears rotating in the enclosure formed with the side plates 22 and 23 and the spacers 25.

The resulting braking torque and the centrifugal force on the counterweights causes the planet gears 20 to lock and come to rest with the counterweights at the radially outer extremity of their travel, position C of Fig. 4. The one way clutch 39 permits the ring gear 19 to rotate in a counterclockwise direction, and the sun gear, ring gear and planet carrier rotate in unison, transmitting power at a 1–1 ratio.

Since the fluid pressure delivered by the pumps varies directly as the torque applied, an increase in input torque requires a greater centrifugal force on the valve plungers to lock the gearset. Thus the locking of the gearset and the shift to a higher speed is delayed by increased torque and advanced by decreased torque. This provides an ideal transmission in which the gear ratio varies directly with speed and inversely with torque.

To place the transmission in neutral the brake shoe 42 carried by housing 14 is released from frictional engagement with brake drum 40, thus releasing the reaction point for ring gear 19.

The second planetary gearset may be designed to transmit power at a different ratio from the first, if desired. In any event, it receives the output speed and torque from the first gearset and further reduces the speed and increases the torque, supplying its output torque from carrier 49 to the driven shaft 12, which may be connected to the driving wheels of a vehicle, or to any other load. The counterweights and valve plungers of the second gearset operate to lock it under certain conditions of speed and torque. The arrangement can be such that the gearsets lock in series and unlock in a similar manner, thus providing a plurality of various gear ratios between the transmission input and output which are automatically effected under the proper conditions of speed and torque.

In Fig. 5 is shown one use of a single planetary gearset constructed according to the present invention. The gearset 58 is coupled between a fluid coupling and a semi-automatic transmission. The gearset 58 operates as an automatic first gear shift.

Although I have shown and described certain embodiments of the invention, it will be understood that I do not wish to be limited to the exact construction shown and described, but that various changes and modifications may be made without departing from the spirit and scope of my invention as defined in the appended claims.

I claim:

1. A transmission comprising a stationary housing containing fluid, a rotatable casing in said housing having an intake passage establishing fluid communication with the interior of said housing, a one way brake between said casing and said housing permitting rotation of said casing in one direction and preventing rotation in the opposite direction, a ring gear carried by said casing, a driving shaft, a sun gear rotated by said driving shaft, a rotatable carrier having side plates adjacent opposite sides of said ring and sun gears, a plurality of planet gears rotatably mounted on said carrier between said side plates and meshing with said ring and sun gears, means between the side plate closing the spaces between said ring, sun and planet gears whereby the latter form a fluid gear pump, said side plates having inlet and outlet passages establishing communication between said gear pump and the interior of said casing, a valve responsive to the output speed of the planetary gearset controlling said outlet passage, and a driven shaft connected to said carrier.

2. A transmission comprising a stationary housing containing fluid, a rotatable casing in said housing having an intake passage establishing fluid communication with the interior of said housing, a one way brake between said casing and said housing permitting rotation of said casing in one direction and preventing rotation in the opposite direction, a ring gear carried by said casing, a driving shaft, a sun gear rotated by said driving shaft, a rotatable carrier having side plates adjacent opposite side of said ring and sun gears, a plurality of planet gears rotatably mounted on said carrier between said side plates and meshing with said ring and sun gears, a counterweight carried by each of said planet gears near the periphery thereof, said counterweights being angularly arranged on their respective planet gears in such a manner as to be substantially balanced about the center of rotation of said carrier, means between the side plates closing the spaces between said ring, sun and planet gears whereby the latter form a fluid gear pump, said side plates having inlet and outlet passages establishing communication between said gear pump and the interior of said casing, a valve responsive to the output speed of the planetary gearset controlling said outlet passage, and a driven shaft connected to said carrier.

3. A transmission comprising a stationary housing containing fluid, a rotatable casing in said housing having an intake passage establishing fluid communication with the interior of said housing, a one way brake between said casing and said housing permitting rotation of said casing in one direction and preventing rotation in the opposite direction, a ring gear carried by said casing, a driving shaft, a sun gear rotated by said driving shaft, a rotatable carrier having side plates adjacent opposite side of said ring and sun gears, a plurality of planet gears rotatably mounted on said carrier between said side plates and meshing with said ring and sun gears, a counterweight carried by each of said planet gears near the periphery thereof, said counterweights being angularly arranged on their respective planet gears in such a manner as to be substantially balanced about the center of rotation of said carrier, means between the side plates closing the spaces between said ring, sun and planet gears whereby the latter form a fluid gear pump, said side plates having inlet and outlet passages establishing communication between said gear pump and the interior of said casing, one of said side plates having a radial bore therein communicating with said outlet passage and forming therewith a valve seat, a plunger reciprocable in said bore and adapted to be moved radially outwardly by centrifugal force during rotation of said carrier to close said outlet passage, and a driven shaft connected to said carrier.

WILLIAM D. TIPTON.

REFERENCES CITED

The following references are of record in the file of this patent:

UNITED STATES PATENTS

| Number | Name | Date |
|---|---|---|
| 1,741,854 | Lyman | Dec. 31, 1929 |
| 2,006,160 | Dodge | June 25, 1935 |
| 2,011,101 | Dodge | Aug. 13, 1935 |
| 2,371,228 | Dodge | Mar. 13, 1945 |
| 2,371,229 | Dodge | Mar. 13, 1945 |
| 2,402,382 | Dodge | June 18, 1946 |
| 2,404,623 | Dodge | July 23, 1946 |